Feb. 15, 1927.
V. M. ALLEN
GLARESHIELD FOR MOTOR VEHICLES
Filed Feb. 10, 1923
1,617,981
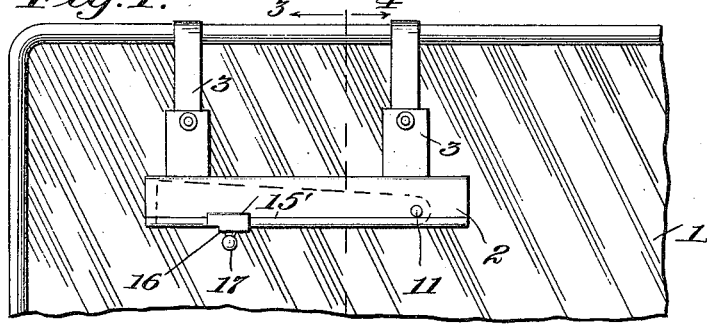
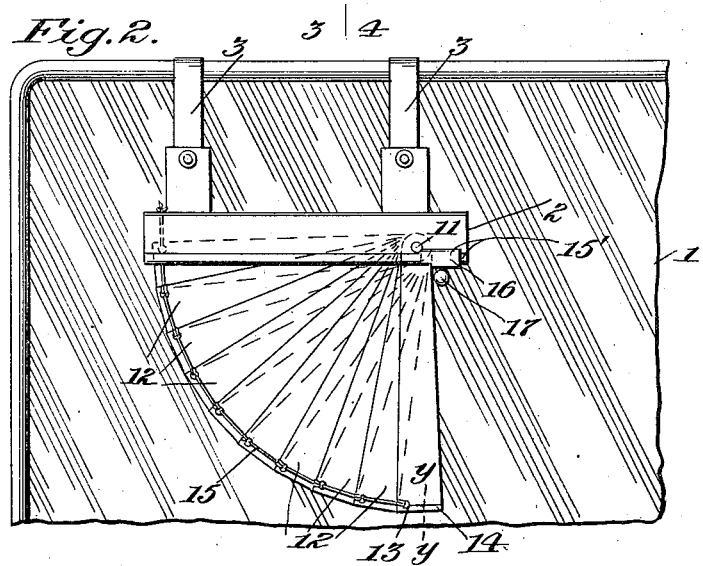
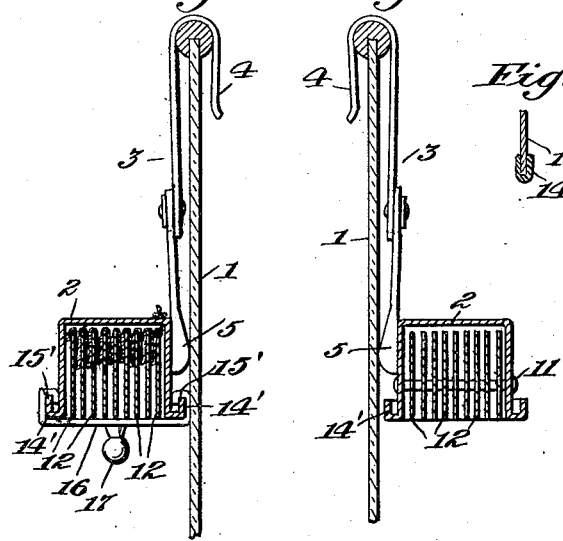
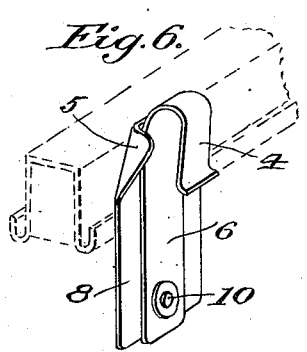
Inventor:
Victor M. Allen,
By Chas. E. Riordan
Att'y.

Patented Feb. 15, 1927.

1,617,981

UNITED STATES PATENT OFFICE.

VICTOR M. ALLEN, OF WAVERLY, NEW YORK.

GLARESHIELD FOR MOTOR VEHICLES.

Application filed February 10, 1923. Serial No. 618,376.

This invention is an attachment for the windshields of automobiles by the use of which the chauffeur will be protected from the blinding glare of the sun or of the headlights of an approaching vehicle while having an unobstructed view of the road ahead.

One object of my invention is to provide a novel collapsible glare shade which may be easily extended to a greater or less degree as the need may be, and another object is to provide a novel glare shade which may be easily applied to or removed from any conventional windshield and which when not in use will be out of the way.

A still further object of the invention is to provide a glare shade which may be adjusted by one hand without stopping the travel of the vehicle, which is not apt to rattle on the windshield nor mar the same, and which will be inexpensive, durable, and not apt to get out of order. The invention is illustrated in the accompanying drawing and will be hereinafter fully set forth.

In the drawing, Fig. 1 is an elevation of portion of a windshield having my glare shade mounted thereon, the glare shade being shown as it appears when not in use.

Fig. 2 is a similar view showing the glare shade arranged for use.

Fig. 3 is an enlarged section on the line $x$—$x$ of Figure 1 looking in the direction indicated by the arrow 3.

Fig. 4 is a section on the line $x$—$x$ of Fig. 1 looking in the direction indicated by the arrow.

Fig. 5 is a detail section on the line $y$—$y$ of Fig. 2.

Fig. 6 is a perspective view showing a support different in some respects from that shown in Figs. 1 to 4.

The windshield 1 may be of the usual or any preferred form. In carrying out my invention, I employ a housing 2 which is inverted U-shape in cross section and may conveniently be formed from sheet metal. This housing is suspended from the upper edge of the windshield by hangers 3 which may be metal straps attached at their lower ends to the housing near the ends thereof and having their upper ends formed into hooks 4 adapted to engage over the windshield as shown. On their side edges at their lower ends, the straps are provided with lateral projections 5 which are adapted to bear against the windshield, as shown clearly in Figs. 3 and 4, whereby to constitute a rest for the housing and avoid rattling of the same against the windshield.

As shown most clearly in Fig. 6, the hanger is composed of an upper member 6 having the hook 4 at its upper end to be engaged over the upper edge of the windshield, and a lower member 8 having its lower end attached to the housing and having the lateral rests 5 on its side edges. The members 6 and 8 are pivotally connected at their meeting ends by a rivet 10 which will frictionally hold them in a set position, and the connection between the lower member and the housing is of the same pivotal frictional holding type. If it be desired to set the housing at its lowest position, the hanger members 6 and 8 are extended in alinement, and by setting the said members at different angular positions the housing may be disposed at various distances from the top of the windshield. If the hanger member 8 be turned through one-half a complete rotation about its pivotal connections and thereby brought into the inverted position shown in Fig. 6, the housing will be disposed at the upper edge of the windshield and be in its highest position. When the hanger member 8 is inverted, the rest lugs 5 are sprung over the member 6 and engage the side edges of the same so that the accidental release of the housing will be prevented. The pivotal connection between the two link members will hold them in any angular relation so that the housing may be set at any height to accommodate tall or short chauffeurs. Inasmuch as the housing will be maintained in its highest position out of the way, shown in Fig. 6, for the greater part of the time, the strain upon the pivots will not cause rapid loosening of the same and they will effectually hold the hanger members in set positions for practically the life of the shade.

Across the housing, adjacent one end thereof, is a pin, rivet or bolt 11 and upon this pin are loosely pivotally engaged a plurality of panels 12 of celluloid or other translucent material. These panels are colored, preferably green, so that they will, when lowered, protect the eyes of the chauffeur from blinding glare but will permit a view of the road ahead. The panels are adapted to extend longitudinally of the casing and be housed therein but they are free except at their pivoted ends and, hence, tend constantly to swing downwardly about the pivot 11 under the force of gravity. The side edges of each panel converge slightly from its free end to its pivoted end and in the free end of each panel adjacent the upper corner thereof is an opening 13, the free end of the panel being fitted with a metal binding 14 whereby folding or buckling of the panel is prevented. Secured in the opening 13 in the lowest panel is one end of a thread or other flexible tie element 15 which is carried through and secured at the opening in each panel and has its end secured in any convenient or preferred manner in the housing. This tie element obviously connects the several panels and limits the downward movement thereof, the length of the element between any two openings 13 being less than the width of the panel so that the panels will overlap when lowered, as shown in Figure 2.

The ends of the housing 2 are closed and along its side edges are upstanding reentrant flanges 14¹ which are slidably engaged by the overhanging counterpart flanges 15¹ of a panel-controlling device 16, said device being provided with a knob 17 or other form of handle on its under side. The ends of the flanges 14¹ are closed by crimping or other approved means so as to prevent the slide 16 being pushed from the housing, and the slide extends across the open bottom of the housing so as to support the panels in closed position therein, as shown in Fig. 3, the panels lying in parallel planes within the housing.

Upon reference to Figs. 1 and 2, it will be noted that the pivot 11 is located in spaced relation to the adjacent end of the housing so that the slide 16 may be moved beyond the pivot and thereby permit the front panel to swing down into a perpendicular position, the remaining panels swinging down to successively less extent so as to form a substantially triangular or fan-shaped shade in front of the operator. When the shade is to be closed, the slide 16 is merely pushed to the opposite end of the housing, whereupon it will ride against and under the edges of the panels and force them to swing upwardly into the housing, as will be readily understood on reference to Fig. 1, the panels resting on the slide and being supported thereby. When the use of the shade is again necessary, the slide is merely pushed toward the pivot, and beyond the same if the shade is to be fully opened.

My device is very simple and compact and is not apt to get out of order. It is operated by merely pushing the slide in one or the other direction and, when closed, the panels are completely enclosed by the housing and protected against damage. The metallic binding on the wider free ends of the panels prevent curling thereof and lend weight thereto so that they will quickly swing downward as the controlling slide is moved back, and the slide may obviously be quickly and easily manipulated by one hand while the vehicle is steered with the other hand. It may be desirable, sometimes, to give the upper two panels a darker color than the other panels so that the chauffeur will be protected from the direct glare of a low sun which is straight ahead without having his view of the road obstructed.

Having thus fully described my invention, what I claim as new and desire to secure by Letters Patent of the United States is:—

1. A glare shade for windshields comprising a housing, a plurality of panels pivoted concentrically in the housing, and means movable along the housing to effect swinging of the panels whereby they may be enclosed in the housing or projected therefrom.

2. A glare shade for windshields comprising a support, a plurality of panels having a common pivotal connection with the support, a flexible connection between the free ends of the panels and between the panels and the support, the points of attachment of said connection to adjacent panels being spaced apart a distance less than the width of the free ends of the panels whereby the edges of the panels will overlap in the extended position of the panels, and means movable along the support to effect collapse or projection of the panels.

3. A glare shade for windshields comprising a housing, means for supporting the housing upon a windshield, a plurality of panels mounted upon a common pivot at one end of the housing, a slide movable along the bottom of the housing to hold the panels in the housing or permit them to swing downwardly therefrom, and means to limit the downward swinging movement of the panels.

4. A glare shade for windshields comprising a housing having upstanding reentrant flanges on its sides at its bottom, a plurality of panels mounted upon a common pivot at one end of the housing, a slide extending across the bottom of the housing and provided at its sides with upwardly projecting overhanging flanges mating with and slidably engaging the flanges on the housing, said slide being adapted to hold the panels in the housing or permit them to depend therefrom, and means to limit the downward movement of the panels.

In testimony whereof I hereunto affix my signature.

VICTOR M. ALLEN.